(12) United States Patent
Dianda et al.

(10) Patent No.: US 6,523,074 B1
(45) Date of Patent: Feb. 18, 2003

(54) APPARATUS AND METHOD TO MANAGE THE INVOCATION OF FEATURE SERVICE

(75) Inventors: Janet Ruth Dianda, Naperville, IL (US); Lawrence Gerard Mayka, Aurora, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 334 days.

(21) Appl. No.: 09/649,451

(22) Filed: Aug. 25, 2000

(51) Int. Cl.[7] .......................... G06F 13/00; G06F 13/14
(52) U.S. Cl. ...................................... 710/100; 710/305
(58) Field of Search ................................. 710/100, 305

(56) References Cited

U.S. PATENT DOCUMENTS

| 5,907,607 A | * | 5/1999 | Waters et al. ............... 379/207 |
| 6,215,489 B1 | * | 4/2001 | Kaplan ....................... 345/334 |
| 6,338,088 B1 | * | 1/2002 | Waters et al. ............... 709/226 |

* cited by examiner

Primary Examiner—Rupal Dharia
Assistant Examiner—Tim Vo

(57) ABSTRACT

An apparatus and method facilitating creation and modification of services with a data processing system by grouping of objects configured on a bus arrangement. At least one message that is associated with an event is processed by the objects. An exemplary embodiment exploits the present invention with an arrangement comprising a service logic component bus connected to a plurality of sub-busses. Examples utilizing the exemplary embodiment are included.

24 Claims, 5 Drawing Sheets

APPARATUS AND METHOD TO MANAGE THE INVOCATION OF FEATURE SERVICE

FIELD OF THE INVENTION

This invention relates to the area of data processing systems, and, more specifically, to service creation, modification, and execution in operating data processing systems.

BACKGROUND OF THE INVENTION

Data processing systems span a wide spectrum of service areas including telecommunications, financial services (including banking), marketing, insurance, travel, and sales. A modern data processing system must provide a multitude of services that achieve the needs of its customers. Because the needs are many and change over time, it is desirable that a data processing system allows for flexibility in creation and modification of services. Such addition and modification of services is called "service creation" in the art.

Typically, a data processing system detects an input event that initiates one or more services and subsequent input events as the services continue. Examples include a customer requesting cash from an ATM machine (associated with the area of banking) or an incoming call for a telephone customer (corresponding to the area of telecommunications). Moreover, with the popularity of open interfaces (e.g. the application programming interface (API) offered by the class libraries available in the Java programming language) and with the ubiquitous presence of data networking (such as the Internet), service creation is not limited only to the manufacturer of the data processing system and has expanded to third-party programmability of services. With open interfaces, services can be developed faster because third-party programmers, who otherwise would not be able to participate in the development activities, can also support software development.

One problem with service creation that has limited its application is that any added functionality may conflict with existing functionality. These conflicts may be innocuous, such as a brief delay in the service, or may cause the service to stop functioning altogether. In the current art, there is no manner to avoid such conflicts without hours of regression testing in a laboratory environment.

In the current art, services for a data processing system may be implemented with object-oriented languages such as C++ and Java. Object-oriented languages offer the advantage of simplifying programming and increasing code reuse by associating an object's data and code into one variable. (An object is commonly referred as a software entity having attributes and at least one "method" or "operation," which may process some of the attributes.) The code can be reused in another unrelated program. However, object-oriented languages do not directly support a flexible grouping of objects to cooperate in responding to an input event that corresponds to one or more services. The LISP programming language does support limited grouping of objects that are parts of a single object and that belong to super-classes of the object's class. However, the LISP programming language offers only a rigid, pre-structured precedence scheme or an unstructured one. Moreover, an object can be invoked only once for an event. Enhancing the capability of grouping objects from potentially disparate sources will enhance the flexibility and facilitation of creating and modifying services.

With the development of software by third-party programmers, applications software may utilize objects that are written in different programming languages. Prior art does not support object preference across a plurality of programming languages. An invention that supports object preference and allows the multiple invocation of one or more objects, to serve multiple roles in reacting to an event, would facilitate the structuring and control of feature interactions.

The competition of the marketplace is keen and requires fast delivery of new services and the modifications of existing services. Thus, the marketplace beckons for innovations that address the heretofore objectives.

SUMMARY OF THE INVENTION

The present invention provides an apparatus and method to enhance service creation, modification, and execution in a data processing system. Applicable service areas include telecommunications, financial services, marketing, insurance, travel, and sales. The present invention enables services to be implemented by the grouping of objects to enhance cooperation and thus avoid conflict in response to an input event that is associated with the service. Moreover, the service can be associated with a plurality of events.

The present invention advances a service creation and execution environment which facilitates the addition of new service functionality on a bus structure in a manner which allows the specification of precedence in handling events, with regards to existing functionality, to resolve conflicts. Objects corresponding to services are configured on one or more of the sub-busses that are connected to a service logic component bus, to specify their roles and precedence with regards to other objects on the service logic component bus. Further flexibility is provided through configuring the objects on multiple service logic component buses such that each event is assigned to a service logic component bus or that each customer group is assigned to a service logic component bus. The present invention allows for the flexibility of arranging objects on sub-buses, including the ability of a given object to play multiple roles in reacting to an event associated with one or more services. The flexibility of arranging objects to specify their roles and precedence with regards to other objects in responding to events facilitates development of software by third-party programmers, including software in which objects are written in different programming languages.

An exemplary embodiment of the invention utilizes a bus arrangement comprising a set of service logic busses, each connected to a pre-process sub-bus, a determine-response sub-bus, a post-process sub-bus, each sub-bus corresponding to a specified role for the objects on the sub-bus to play in responding to the event. A role is a classification of service functionality to which this invention assigns a position in the time-order of execution of an object invocation algorithm. Examples of object invocation algorithms are "invoke all objects playing this role" and "invoke objects playing this role until one answers 'completed'." In the exemplary embodiment, an object may participate in responding to an event by playing one, two, or three roles: the role of pre-processing an event before the response has been determined, the role of determining the response to an event, or the role of post-processing the event after the response has been determined.

Pursuant to detecting an event associated with the service, a message representing the event traverses the service logic bus arrangement corresponding to the specific event. The message is processed by the objects configured on the pre-process sub-bus, the determine-response sub-bus, and the post-process sub-bus. Having traversed the bus arrangement, an applications program determines a response, resulting with at least one action being executed.

Several examples of the exemplary embodiment are presented. The first example is associated with financial services in which a customer requests an ATM machine to dispense cash. The second example is associated with telecommunications services in which a telephone user subscribes to multiple services, including a call waiting feature, a call screening feature, and a call forwarding feature.

DETAILED DESCRIPTION

Figure 1:
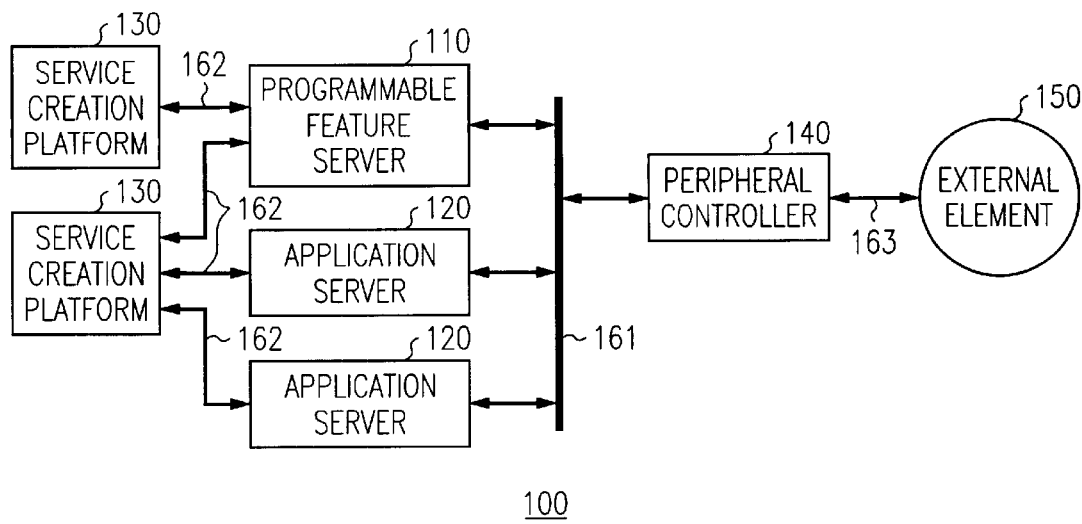
FIG. 1 shows an architecture of a data processing system incorporating an exemplary embodiment of the present invention.

FIG. 1 illustrates a block diagram of a data processing system 100 incorporating an exemplary embodiment of the present invention. Data processing system 100 comprises at least one processor. In this exemplary embodiment, there are three processors: programmable feature server 110 and two application servers 120. Programmable feature server 110 and application server 120 communicate with each other through interconnection media 161 so that data, commands, and command responses can be sent and received. In addition, programmable feature server 110 and application server 120 can affect external element 150 through peripheral controller 140 via link 163. As examples, external element 150 can be a telecommunications network or a cash dispensing mechanism that is associated with an ATM machine. Peripheral controller 140 supports a communications protocol that is compatible with the communications protocol that is employed by network element 150 through link 163. Examples of communications protocols include proprietary protocols and standardized protocols such as X.25 and TCP/IP. Programmable feature server 110 and application server 120 communicate with peripheral controller 140 through interconnection media 161.

An applications program, which supports the services provided by the data processing system, can be developed on service creation platform 130. The applications program can execute on programmable feature server 110, or remotely on application server 120, or on an external computer. Service creation platform 130 communicates with programmable feature server 110 and application servers 120 through link 162, which could utilize TCP/IP protocol or some other applicable protocol.

To facilitate the creation of applications programs at service creation platform 130, service creation platform 130 supports a graphical user interface (GUI) and utilizes an application programming interface (API) provided by the programmable feature server 110. Both the graphical user interface and the application programming interface are further discussed in the context of FIG. 6.

Figure 2:
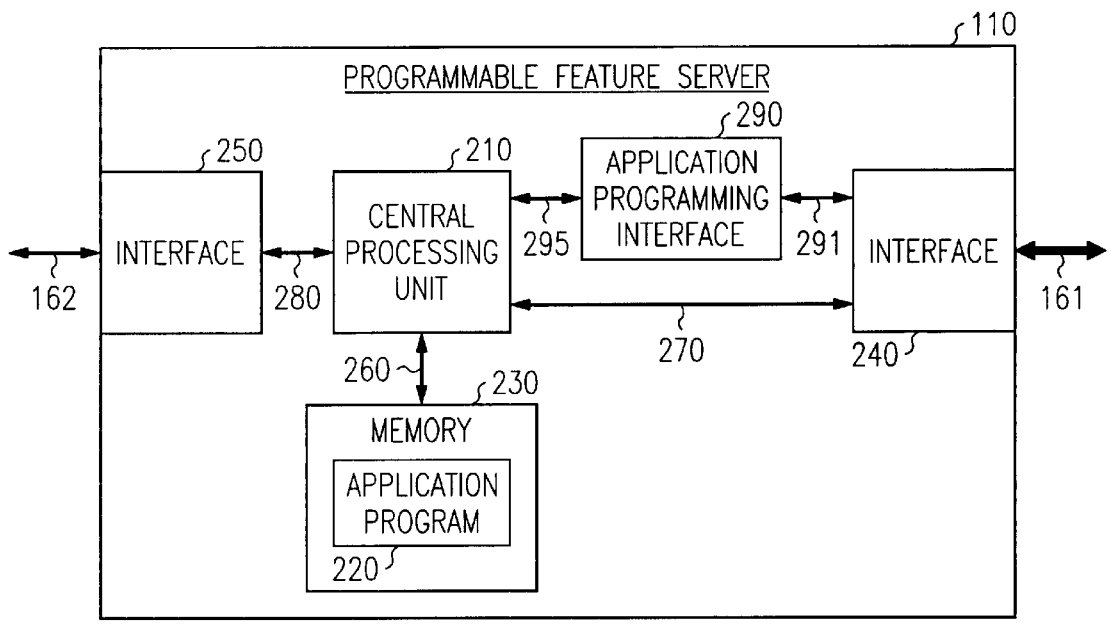
FIG. 2 shows an architecture of a programmable feature server that is illustrated in FIG. 1.

FIG. 2 shows an architecture of programmable feature server 110 of FIG. 1. CPU 210 executes one or more applications programs 220. The applications programs may be centrally located at programmable feature server 110 or may be distributed across other processing entities (such as application server 120 corresponding to applications program 320 in FIG. 3).

CPU 210 communicates with memory 230 through link 260 in order to retrieve data about applications program 220. Interface 240 enables CPU 210 to communicate with interconnection media 161 through link 270. Interface 250 enables CPU 210 to communicate with link 162 through link 280. API 290 is an interface to a body of software that can vary from a small software library to the software of a large switching system and facilitates software reusability. CPU 210 communicates with API 290 through lo link 295, and API 290 communicates with Interface 240 through link 291.

Figure 3:
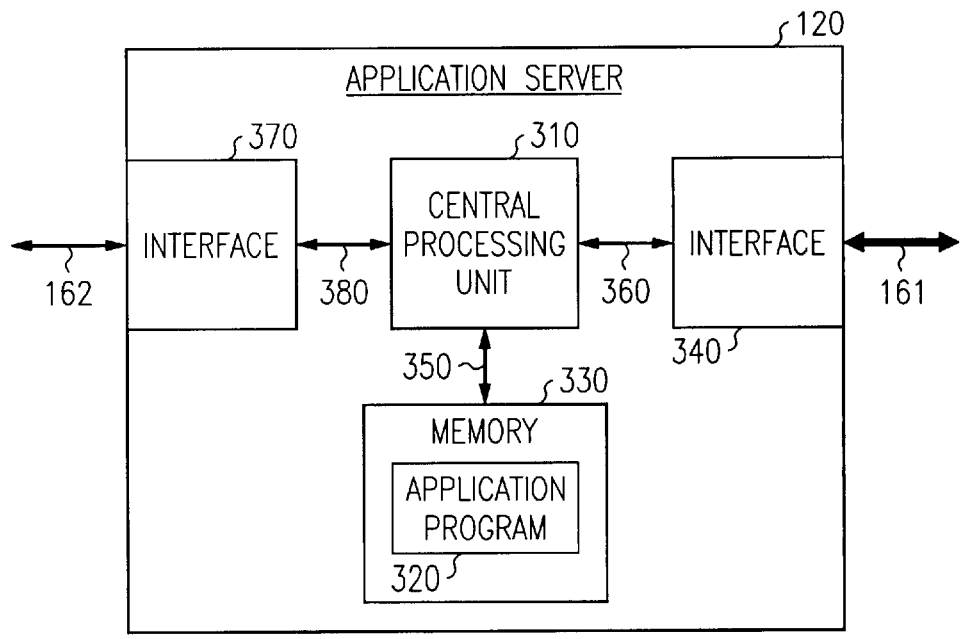
FIG. 3 shows an architecture of an application server that is illustrated in FIG. 1.

FIG. 3 shows an architecture of application server 120 of FIG. 1. CPU 310 remotely executes applications program 320 with respect to programmable feature server 110. CPU 310 communicates with memory 330 through link 350 in order to retrieve data about applications program 320. Interface 340 enables CPU 310 to communicate with interconnection media 161 through link 360. Interface 370 enables CPU 310 to communicate with link 162 through link 380.

Figure 4:
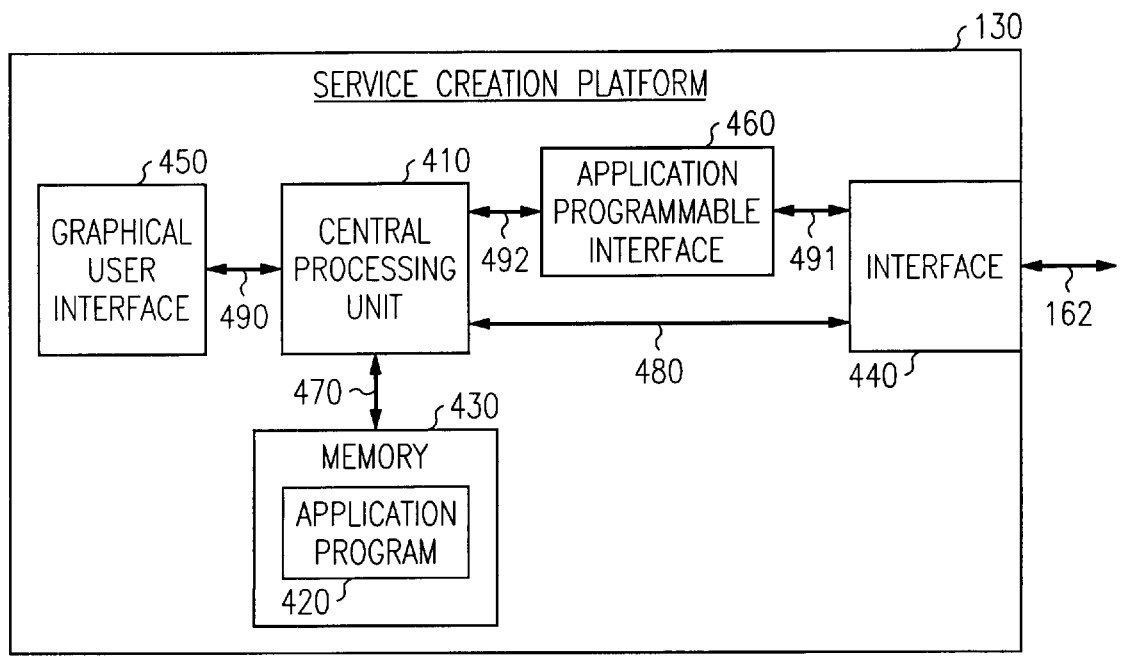
FIG. 4 shows an architecture of a service creation platform that is illustrated in FIG. 1.

FIG. 4 shows an architecture of service creation platform 130 of FIG. 1. Interface 440 enables CPU 410 to communicate with link 162 through link 480. CPU 410 communicates with graphical user interface (GUI) 450 through link 490. In the exemplary embodiment, GUI 450 is implemented as a combination of hardware and software that facilitates creating applications program 420 (which can execute as applications program 320 or 220 if ported to application server 120 or programmable feature server 110, respectively). GUI 450 is further discussed in the context of FIG. 6. GUI 450 can reside at another entity within data processing system 100, such as programmable feature server 110.

Application programming interface (API) 460 is a service creation "interface" which facilitates programming to the API 290 provided by the programmable feature server 110. API 460 is accessed by CPU 410 through link 490. The application server 120 can remotely access reusable software of feature server API 290 through link 291, interface 240, and link 161.

Figure 5:
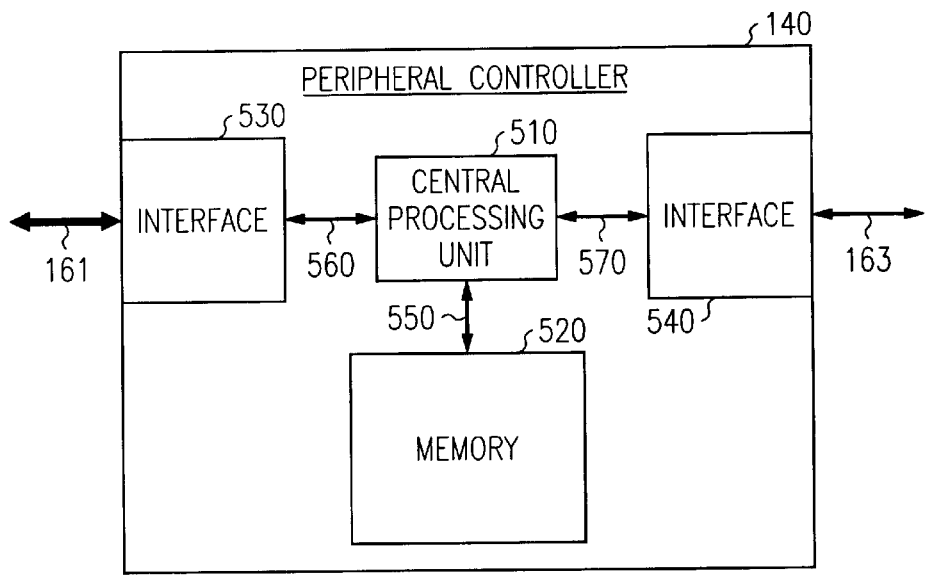
FIG. 5 shows an architecture of a peripheral controller that is illustrated in FIG. 1.

FIG. 5 is a block diagram of peripheral controller 140 of FIG. 1. CPU 510 executes a software program that supports a compatible protocol to external element 150 through link 570, interface 540, and link 163. CPU 510 communicates with memory 520 through link 550 in order to obtain data necessary for supporting the compatible communications protocol. Interface 530 enables CPU 510 to communicate with interconnection media 161 through link 560.

The present invention supports a bus arrangement allowing objects to be flexibly configured on connected sub-busses. The bus arrangement facilitates development of software so that an object can be invoked one or multiple times for each event of interest to it, playing one or multiple roles, through its position on one or more of the sub-busses.

An object can be invoked for one or more events. An object implements a service. GUI 450 provides symbolic representation for service objects, which are software modules comprised of software objects written in C++, Java, or other programming languages. The symbolic representations for the service objects may be attached (e.g., via drag and drop) on one or more sub-busses on one or more service logic component busses, (which have events assigned to them) according to the order in which each service object should be invoked to handle an event.

Arranging the service objects on the sub-busses of one or more service logic component busses on GUI 450 results in autogeneration of code. Autogeneration is the automatic construction, via a computer program, of an executable implementation of a software design from a simpler, more abstract, or more human-understandable source input representation. Ordinary compilation of a C program into machine instructions is one common example of autogeneration; but the source input may be graphical (e.g., circles and arrows on a GUI) instead of textual, and the output executable may be specialized for its particular circumstances or otherwise optimized (e.g., for faster execution). The bus arrangement can be presented on service creation platform 130 in an interactive form and then compiled into a specialized or optimized form for execution on programmable feature server 110. The auto-generated code ensures that the events are passed to the objects in the order prescribed by the busses at service execution time. The auto-generated code is downloaded onto programmable feature server 110, where the service logic component busses are executed at service execution time. The logic invokes the objects in the prescribed order. The objects themselves may be remotely located on application server 120, or may be local to programmable feature server 110. The flexibility of arranging objects, which implement the services, in precedence orders and according to the roles that the object will play for an event, facilitates development of service software by third-party programmers, including software in which objects are written in different programming languages. Consequently, the present invention facilitates the structuring and control of feature interactions.

Figure 6:
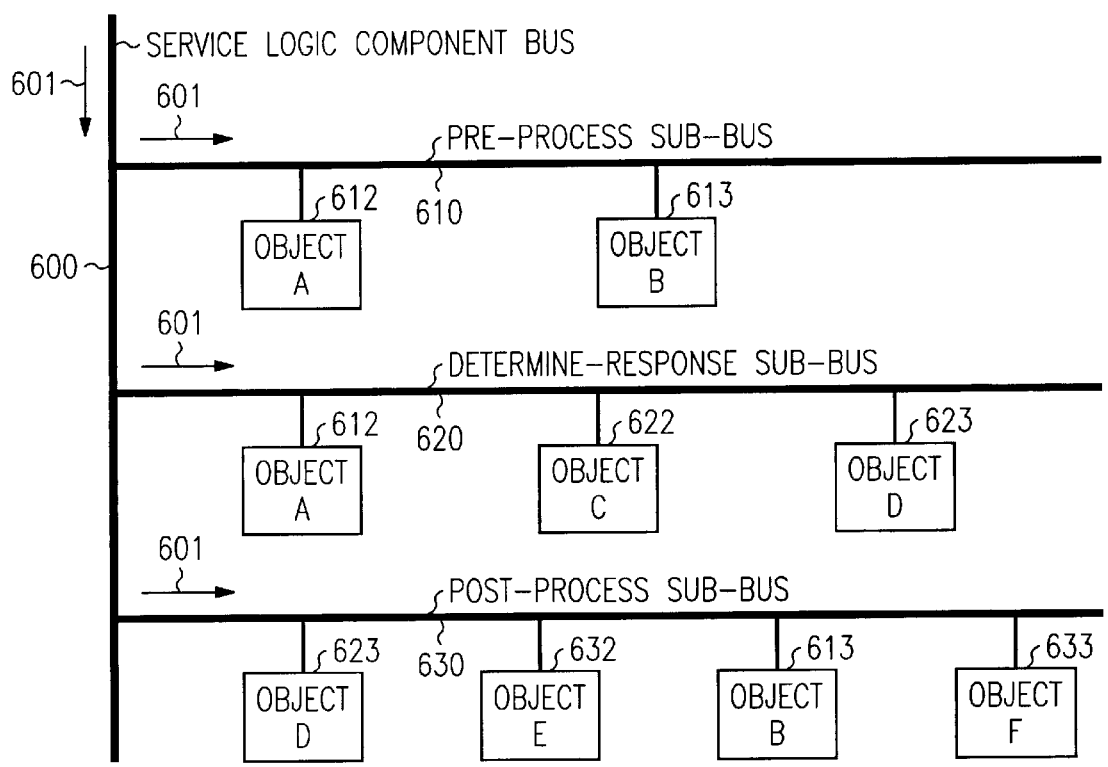
FIG. 6 illustrates an arrangement of a plurality of sub-busses on a particular service logic component bus.

FIG. 6 illustrates an arrangement of a plurality of sub-busses 610, 620, and 630 and service logic component bus 600 that are associated with application program 220, according to the exemplary embodiment of the present invention. Application program 220 utilizes the bus arrangement in order to support and structure multiple services such as telecommunications services or financial services. An example of a telecommunications service is call waiting, and an example of a financial service is a cash transaction at an ATM machine.

One event may be of interest to one or more services. The occurrence of an event of interest to one or more services results in a message 601 being generated and transported over service logic component bus 600. For purposes of clarity, message 601 is represented, for example, as:

event_message(event_type,sub_bus_role, user_ID, other _arguments)

Alternatively, the event_type could be implicit in the message name; in that case, each object interested in that event would have an operation by that name which would be invoked through the service logic component bus in the prescribed order. In that case, message 601 would be represented, for example, as:

specific_event_message(sub_bus_role, user_ID, other_arguments)

Three or more arguments are contained in message 601 corresponding to optionally the type of the event (event_type); the role being played by the current sub-bus (sub_bus_role), with values of "pre-process", "determine-response", or "post-process" in the exemplary embodiment; the identification of the customer associated with the event (user_ID), and possibly zero or more additional arguments providing pertinent data associated with the event (other_arguments).

Message 601 (in which the sub_bus_role argument is set to a value of "pre-process") first traverses pre-process sub-bus 610. While traversing pre-process sub-bus 610, object_A 612 and object_B 613 each process message 601 in turn. As stated above, an object is commonly defined as a software entity having attributes and at least one "method" or "operation," which can process the attributes. Because "method" may be confused with the legal connotation associated with claims, "operation" is used in this specification. The objects may execute locally on programmable feature server 110, where they comprise parts of application program 220, or remotely on application server 120, where they comprise parts of application program 320.

Object_A 612 and object_B 613 can each have a plurality of operations. In such cases, object_A 612 and object_B 613 can execute the appropriate operation according to the specific_event_message (or optionally, the event_type) and the sub-bus. This is also applicable to objects configured on other sub-busses (e.g. determine-response sub-bus 620 and post-process sub-bus 630).

Each object that is configured on pre-process sub-bus 610 sequentially processes message 601. In FIG. 6, object_A 612 can process any of the arguments contained in message 601 (corresponding to the attributes of object_A 612), modify any of the arguments, append additional arguments to message 601 before passing message 601 to object_B 613, and take appropriate actions. Processing corresponding to pre-process sub-bus 610 is further discussed in the context of FIG. 7.

Message 601 (in which the sub_bus_role argument is set to a value of "determine-response") then traverses determine-response sub-bus 620. Object_A 612, object_C 622, and object_D 623 are configured on determine-response sub-bus 620 and may process message 601, possibly resulting in modifying and appending arguments in message 601, and in taking appropriate actions. Processing corresponding to determine-response sub-bus 620 is further discussed in the context of FIG. 8.

Message 601 (in which the sub_bus_role argument is set to a value of "post-process") is then passed to post-process sub-bus 630. Object_D 623, object_E 632, object_B 613, and object_F 633 process message 601, possibly resulting in modifying and appending arguments contained in message 601, and in taking appropriate actions. Processing associated with post-process sub-bus 630 is further discussed in the context of FIG. 9. After message 601 has completed traversing post-process sub-bus 630, application program 220 utilizes the data that is contained in message 601 in order to execute a response to the event specified by the determining object on determine-response sub-bus 620. The response comprises at least one action. An example of an action is to ring a telephone in telecommunications services.

In the exemplary embodiment, a given object can appear on a plurality of sub-busses, as is the case for object_A 612, object_B 613, and object_D 623 on service logic component bus 600. In such cases, an object executes "operations" that are pertinent to the sub-bus in which message 601 appears. As an example, object_A 612 may have two "operations." The first "operation" is associated with processing on pre-process sub-bus 610, and the second "operation" is associated with processing on determine-response sub-bus 620. Also in the exemplary embodiment, service logic component bus 600, pre-process sub-bus 610, determine-response sub-bus 620, and post-process sub-bus 630 are automatically compiled into software by service creation platform 130 and downloaded onto programmable feature server 110 for execution, although the bus structure can be implemented with a hardware arrangement or a combination of hardware, software compilation, or software interpretation.

In an alternative embodiment, there can be a plurality of service logic component busses, with each event assigned to a specific service logic component bus, as shown in Table 1 for an example. A given object can appear on a plurality of sub-busses, on a plurality of service logic component busses (SLCB).

TABLE 1

EVENT-SLCB MAPPING

| EVENT | ASSIGNED TO SERVICE LOGIC COMPONENT BUS |
|---|---|
| event_A | slcb_A |
| event_B | slcb_B |
| event_C | slcb_A |
| event_D | slcb_C |
| event_E | slcb_C |

In the exemplary embodiment, service logic component bus 600, pre-process sub-bus 610, determine-response sub-bus 620, and post-process sub-bus 630 are located at programmable feature server 110 while objects 612, 613, 622, 623, 632, and 633 can be located at programmable feature server 110 or application server 120. However, in a variation of the exemplary embodiment, service logic component bus 600, pre-process sub-bus 610, determine-response sub-bus 620, and post-process sub-bus 630 can be located or extended at application server 120. Moreover, if no objects are configured on pre-process sub-bus 610 or post-process sub-bus 630, the effect of the associated sub-bus upon determining the response to the corresponding event is deleted; in other words, the associated sub-bus is logically removed with respect to application program 220. One skilled in the art appreciates the fact that additional sub-busses can be included with application program 220 in order to refine the determination of the response.

As discussed in connection with FIG. 4, GUI 450 enables the programmer to configure objects on a specified sub-bus. With some object-oriented software languages, such as Java or C++, application programming interface(API) 460 enables software code to be reused, including a large set of classes from which objects are created. (A class is a definition template for structuring and creating objects with the same attributes and operations.) Thus, API 460 enables a programmer to code software productively by reusing software code. GUI 450 allows the programmer to invoke an object multiple times for an event by configuring the object on a plurality of sub-busses (such as pre-process sub-bus 610, determine-response sub-bus 620, and post-process sub-bus 630). Moreover, with a plurality of objects (such as object_A 612, object_B 613, object_C 622, object_D 623, object_E 632, and object_F 633) the programmer can implement objects in different programming languages.

In the exemplary embodiment, message 601 consecutively traverses each of the sub-busses 610, 620, and 630. The bus arrangement (comprising service logic component bus 600, and sub-busses 610, 620, and 630) enables services to be developed while controlling feature interactions. The present invention facilitates service development by supporting a plurality of service logic component busses, each with a plurality of sub-busses in which an object can be configured on one or more of the sub-busses (on one or more of the service logic component busses), and in which objects can be configured in a priority order (as discussed in FIG. 8). When processing an event, another event could be generated (either externally, or as a result of an action taken by objects processing the original event), which could have various results, including finishing the processing of the original event, then processing the new event on its assigned service logic component bus, or the processing of the original event could be abandoned, and the new event could be immediately processed, according to the logic of application program 220 handling the events.

Several examples illustrate the exemplary embodiment. The first example addresses a financial service. An application program 220 exists to support the financial service. A customer initiates a cash transaction, requesting cash to be withdrawn from the customer's account. After inputting the necessary information into the ATM machine, message 601 is created and traverses service logic component bus 600. Message 601 assumes the form:

event_message(event_type=cash,user_ID=account_#, password,requested_amount), where "event_type" identifies that the customer wishes to initiate a cash transaction for "requested_amount", the customer is associated with the "account_#", and the customer is verified with the "password". Message 601 traverses determine-response sub-bus 620, in which arguments "new_balance" and "amount_cash_dispensed" are appended to the arguments. The argument "new_balance" is the new balance after the completion of the cash transaction and "amount_cash_dispensed" is the amount of cash that will be dispensed by the ATM machine. Finally, message 601 traverses post-process sub-bus 630, in which "charge_amount" and "number_of_transactions_this_month" are appended to the arguments. The argument "charge_amount" is the amount that the customer is charged for the transaction (ATM charge) and "number_of transactions_this_month" is the number of transactions that the customer incurred thus far in the month. Typically, processing on post-process sub-bus 630 is associated with updating counts and billing. The processing by objects on sub-busses 610, 620, and 630 determines the response, causing the dispensation of cash to the customer and the updating of the customer's account.

A second example addresses telecommunications services. A customer subscribes to call waiting, call screening, and call forwarding. Each subscribed service may be implemented as an object, attached to the appropriate service logic component busses, on the appropriate sub-busses. An application program 220 exists to support the customer's bundle of services. With an event of an "incoming call" for a customer, message 601 is generated. Message 601 traverses service logic component bus 600, having the form:

event_message(event_type=incoming_call,called_DN, calling_DN), or a message of:
incoming_call(called_DN,calling_DN), in which the event type is specified in the message name, where called_DN is the telephone party being called by the telephone party identified by calling_DN. As with the first example, message 601 traverses pre-process sub-bus 610, determine-response sub-bus 620, and post-process sub-bus 630. The objects which implement call screening, call waiting, and call forwarding have been configured, in that order, on determine-response sub-bus 620 for the service logic component bus 600 assigned to the incoming_call event for the called telephone party's (called_DN) bundle of services. When the call screening object on determine-response sub-bus 620 receives the incoming_call event, it checks the calling_DN value to verify that the customer is willing to accept calls from this DN. If the calling_DN is acceptable, then the call screening object does not determine the response to the event. The event is then passed to the next object on determine-response sub-bus 620, the call waiting object. If the called telephone party is currently talking with another telephone party, then the call waiting object determines the response to be "alert subscriber" (called_DN), and application program 220 takes appropriate actions, to request that a call waiting tone be generated to the called telephone party. The call forwarding object on the determine-response sub-bus does not receive the event in this example, because the call waiting object already determined the response. The call screening, call waiting, and call forwarding service objects execute in application program 220 on programmable feature server 110, or remotely on application program 320 on applications server 120. If a subsequent event "flash_hook" occurs as generated by the called telephone party, a service logic component bus assigned to the "flash_hook" event handles the event with subsequent processing by the associated objects configured on its sub-busses. Determine-response sub-bus 620 for this event may contain a call waiting object, which may determine that the response is "connect the called telephone party to the calling telephone party (calling_DN)".

In the exemplary embodiment, the invention facilitates the structuring of interactions between objects by configuring objects 612, 622, and 623 on determine-response sub-bus 620 in a priority order. In the second example, if a subsequent event "flash_hook" occurs as generated by the called telephone party, two different objects (such as object_C 622 and object_D 623) on the determine-response sub-bus 620, attached to the service logic component bus assigned to the event "flash_hook", may have an interest in the event and would, if invoked, each generate responses. One skilled in the art appreciates that the flash_hook event could be assigned to a different service logic component bus than the incoming_call event, as illustrated in Table 2. In the second example, object_C 622 (which is associated with call waiting) would place the first call on hold and connect the called party to the incoming call; whereas object_D 623 (which is associated with three-way calling) would place the first call on hold and provide dial tone for initiating a new call. In the second example, however, determine-response sub-bus 620 enforces a priority order. The call waiting feature has higher priority than the three-way calling feature. Thus, object_C 622 (which is associated with call waiting) is invoked first on determine-response sub-bus 620, and thus object_C 622 determines the actual response. Object_D 623 (which is associated with three-way calling) is not invoked.

TABLE 2

EVENT-SLCB MAPPING

| EVENT | ASSIGNED TO SERVICE LOGIC COMPONENT BUS |
|---|---|
| incoming_call | slcb_A |
| flash_hook | slcb_B |

The second example illustrates that application program 220 can encounter a plurality of events. Thus, application program 220 can complete the processing of the first event before processing the second event. In other cases, the second event is discarded while the processing of the first event is completed, or the first event might be discarded, and the second event could be processed. Application program 220 determines how to handle the multiple events. Service objects, such as associated with the call waiting service, may be assigned to service logic component busses, to handle a multitude of different event types including "incoming_call", "flash_hook", "call_disconnect", "outgoing_call", and so forth.

One skilled in the art appreciates the fact that the present invention is applicable to numerous telecommunications services such as voice services, data services, multimedia services, and Internet services. Moreover, the applicability of the present invention spans a wide spectrum of service areas including marketing, insurance, travel, and sales.

Figure 7:
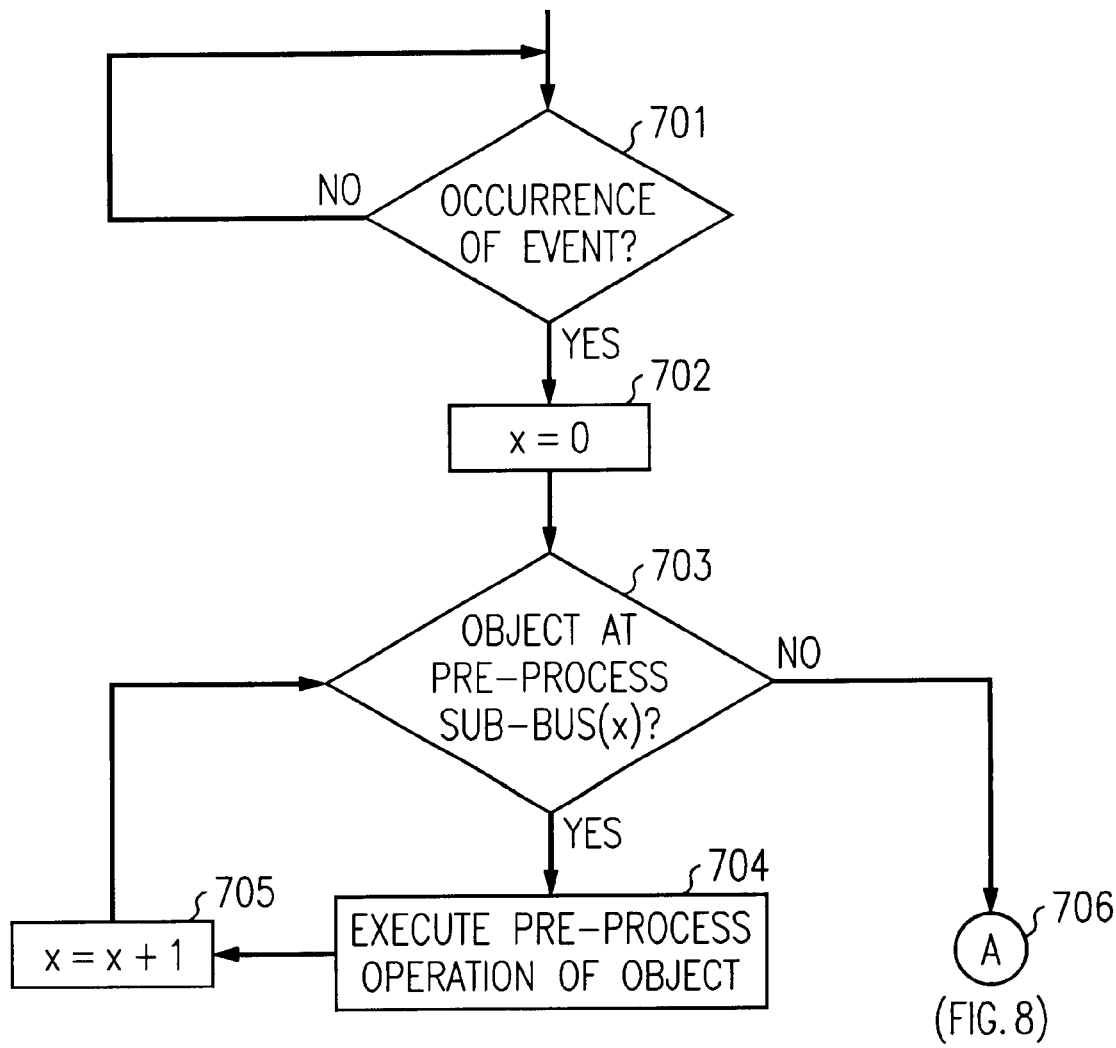
FIG. 7 is a flow diagram associated with a collection of objects configured on a pre-process sub-bus.
Figure 8:
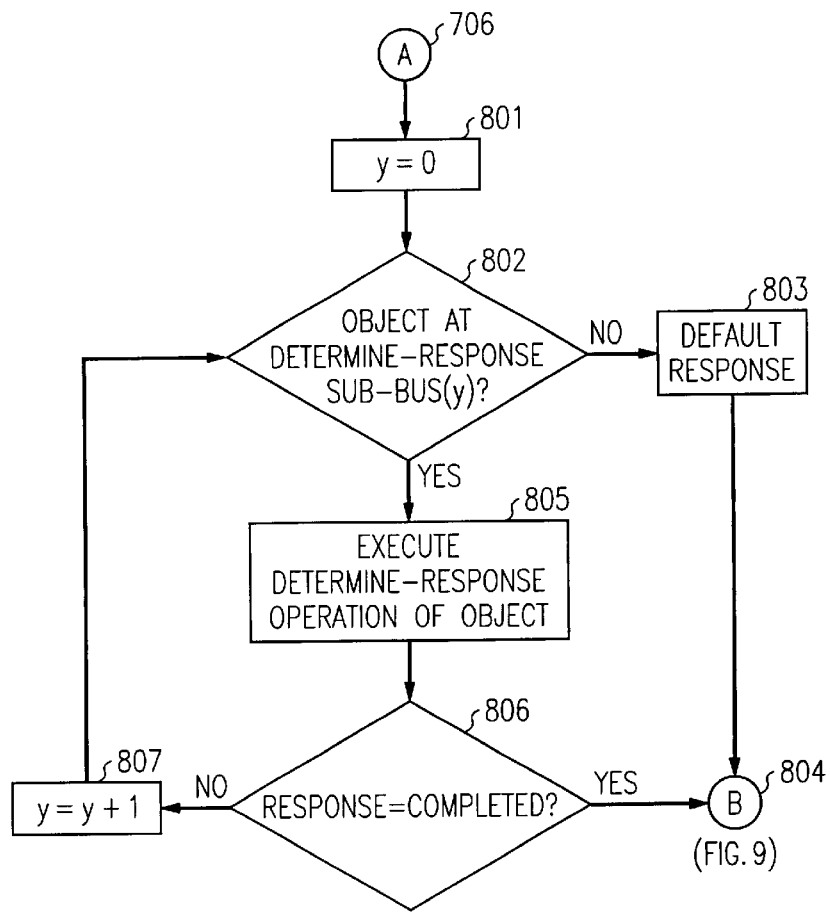
FIG. 8 is a flow diagram associated with a collection of objects configured on a determine-response sub-bus.

FIG. 7 is a flow diagram associated with a collection of objects configured on pre-process sub-bus 610. Step 701 determines the occurrence of an event as indicated by message 601 traversing sub-bus 610. In the exemplary embodiment, in step 702, an index pointer to the object's position on the sub-bus is reset to that of the first object on sub-bus 610. Step 703 determines if message 601 shall be processed by another object. If so, the pre-process "operation" of the object processes message 601 in step 704. The index pointer to the next object is incremented in step 705. Step 703 is then repeated. In step 703, if it is determined that no remaining objects are to be traversed on pre-process sub-bus 610, message 601 is passed to determine-response sub-bus 620 in step 706. Processing on determine-response sub-bus 620 is shown in FIG. 8. Alternative embodiments may compile sequencing of object invocations into the layout of the generated target code, instead of using index pointers.

In the exemplary embodiment, each object on pre-process sub-bus 610 will be invoked to handle the event, and the order may or may not be important. Service creation platform 130 offers the choice of ordered or unordered objects on pre-process sub-bus 610.

Figure 9:
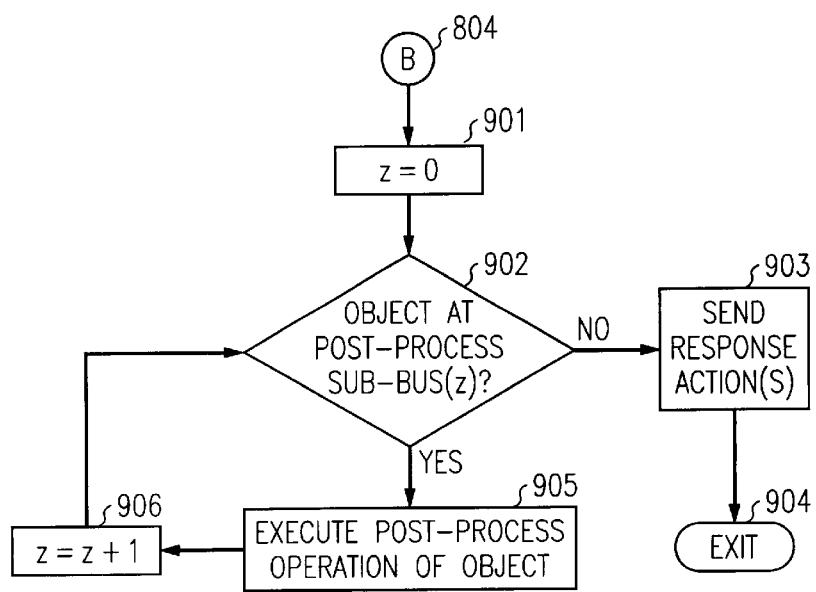
FIG. 9 is a flow diagram associated with a collection of objects configured on a post-process sub-bus.

FIG. 8 is a flow diagram associated with a collection of objects configured on determine-response sub-bus 620. In step 801, an index pointer to the object's position on the sub-bus is reset. Step 802 determines if message 601 shall be processed by another object. If there are no remaining objects on determine-response sub-bus 620, default response 803 is indicated in message 601 and message 601 is passed to post-process sub-bus 630 in step 804. Step 803 is typically executed if no objects are configured on determine-response sub-bus 620, or if no object chose to determine that the response is completed. If it is determined that another object shall process message 601, the determine-response "operation" of the object processes message 601 in step 805. If the object determines that the response is completed, message 601 is passed to post-process sub-bus 630 (as shown in FIG. 9) in step 804. Otherwise, the index pointer to the next object is incremented in step 807, and step 802 is repeated.

In the exemplary embodiment, objects are configured on determine-response sub-bus 620 in a priority order. Changing the ordering of objects on determine-response sub-bus 620 may change the response to an event.

FIG. 9 is a flow diagram associated with a collection of objects configured on post-process sub-bus 630. In step 901, an index pointer to the object's position is reset. Step 902 determines if message 601 shall be processed by another object. If not, in step 903 data delineating the response is formatted by application program 220 and may be sent to one or more external elements through peripheral controller 140. The flow diagram is exited in step 904. If there are remaining objects on post-process sub-bus 630, message 601 is processed by the post-process "operation" of the designated object in step 905. The index pointer to the next object situated on post-process sub-bus 630 is incremented in step 906, and step 902 is repeated.

Alternative embodiments may utilize a plurality of service logic component busses for supporting application program 220. Each event that could occur is assigned to a service logic component bus. Message 601 traverses the appropriate service logic component bus that is assigned to the specific event_message.

More generally, each service logic component bus may be associated with one value, or a subset of the values, of one or more event attributes. An event attribute is a datum associated with an event, such as its event_type and the customer_group to which the initiating customer belongs. The values of such event attributes are usually but not necessarily included in the event message. The target code generated to implement a given bus can then be specialized for its associated event attribute values. Such specialization reduces run-time processing of the event attributes and may make possible further performance improvements by way of well-known code optimization techniques.

It is to be understood that the above-described embodiment is merely an illustrative principle of the invention and that many variations may be devised by those skilled in the art without departing from the scope of the invention. One skilled in the art appreciates the fact that the present invention is applicable to services in other areas such as marketing, insurance, travel, and sales. It is, therefore, intended that such variations be included with the scope of the claims.

What is claimed is:

1. A data processing system executing at least one application program providing at least one service responsive to at least one event, said data processing system comprising:
    a service logic component bus;
    at least one sub-bus connected to said service logic component bus, each sub-bus including at least one combination of objects for manipulating a set of data fields contained in at least one message according to one of said at least one event;
    means, responsive to said one of said at least one event, for sending said at least one message through said service logic component bus, said at least one message traversing each one of said at least one sub-bus; and
    means for executing one of said at least one service, responsive to said set of data fields of said at least one message after said at least one message traverses said service logic component bus.

2. The data processing system of claim 1, wherein said at least one sub-bus comprises two sub-busses and wherein a first sub-bus and a second sub-bus perform different roles in said means for executing said one of said at least one service.

3. The data processing system of claim 1, wherein said data processing system comprises a distributed processing system.

4. The data processing system of claim 1, wherein each object in one of said at least one combination of objects includes a plurality of operations, and said each object selects an operation to perform on said message according to said one of said at least one event.

5. The data processing system of claim 1, further including a memory means containing said service logic component bus and said at least one sub-bus.

6. The data processing system of claim 1, wherein the data processing system comprises a telecommunications system and said one of said at least one service comprises a telecommunications service.

7. The data processing system of claim 1, wherein the data processing system comprises a financial services system and said one of said at least one service comprises a financial service.

8. A data processing system executing at least one application program providing at least one service responsive to at least one event, said data processing system comprising:
    a plurality of service logic component busses;
    at least one sub-bus connected to one of said plurality of service logic component busses, said at least one sub-bus configured with a combination of objects for manipulating a set of data fields contained in a message, said one of said plurality of service logic component busses selected according to at least one attribute associated with one of said at least one event;
    means, responsive to said one of said at least one event, for sending said message through said one of said plurality of service logic component busses, said message traversing each one of said at least one sub-bus; and
    means for executing one of said at least one service, responsive to said set of data fields of said message after said message traverses said one of said plurality of service logic component busses.

9. The data processing system of claim 8, wherein one of said at least one attribute comprises an event type.

10. The data processing system of claim 8, further comprising:
    means for configuring said combination of objects on one of said at least one sub-bus.

11. The data processing system of claim 10, wherein said means for configuring said combination of objects on said one of said at least one sub-bus comprises a graphical user interface (GUI).

12. The data processing system of claim 11, wherein said GUI offers a user a symbolic representation of said combination of objects, said plurality of service logic component busses, and said at least one sub-bus, and wherein said GUI allows said user to compose one of said plurality of service logic component busses by attaching said combination of objects to said one of said at least one sub-bus.

13. The data processing system of claim 11, wherein a service creation platform autogenerates an executable implementation of said one of said plurality of service logic component busses, and wherein said service creation platform downloads said executable implementation into a programmable feature server.

14. A data processing system executing at least one application program providing at least one service responsive to at least one event, said data processing system comprising:
    a service logic component bus;
    a pre-process sub-bus, a determine-response sub-bus, and a post-process sub-bus connected to said service logic component bus, a first combination of objects associated with said pre-process sub-bus, a second combination of objects associated with said determine-response sub-bus, and a third combination of objects associated with said post-process sub-bus, said first combination, said second combination, and said third combination of objects manipulating a set of data fields contained in a message according to one of said at least one event;

means, responsive to said one of said at least one event, for sending said message through said service logic component bus, said message traversing said pre-process sub-bus, said determine-response sub-bus, and said post-process sub-bus; and means for executing one of said at least one service, responsive to said set of data fields of said message after said message traverses said service logic component bus.

15. The data processing system of claim 14, wherein a second event occurs before executing said response that is associated with said one of said at least one event, and wherein said data processing system processes said second event, preempting said one of said at least one event.

16. The data processing system of claim 14, wherein a second event occurs before executing said response associated with said one of said at least one event, and wherein said data processing system completes processing said one of said at least one event before processing said second event.

17. The data processing system of claim 14, wherein a second event occurs before executing said response associated with said one of said at least one event, and wherein said data processing system omits any processing of said second event.

18. The data processing system of claim 14, wherein the data processing system comprises a telecommunications system and said one of said at least one service comprises a telecommunications service.

19. The data processing system of claim 14, wherein the data processing system comprises a financial services system and said one of said at least one service comprises a financial service.

20. The data processing system of claim 14, further comprising means for remotely executing said at least one application program.

21. The data processing system of claim 14, wherein said first combination of objects and said third combination of objects are arranged in a priority order.

22. The data processing system of claim 14, wherein said second combination of objects is arranged in a priority order.

23. The data processing system of claim 14, wherein said second combination of objects comprises a null set of objects, and wherein a default response is executed.

24. For a data processing system executing at least one application program, said data processing system providing at least one service, wherein one of said at least one application program is accessing at least one sub-bus on at least one service logic control bus and at least one combination of objects, a method of providing one of said at least one service, said method comprising the steps of:

detecting an event that is associated with said one of said at least one service;

sending a message through one of said at least one service logic component bus over one of said at least one sub-bus responsive to said step of detecting;

analyzing, modifying, and appending a set of data fields contained in said message by said at least one combination of objects associated with said one of said at least one sub-bus;

executing a response by said one of said at least one application program upon receiving said data fields.

* * * * *